United States Patent
Oron et al.

(10) Patent No.: US 10,951,577 B2
(45) Date of Patent: Mar. 16, 2021

(54) DEVICE AND METHOD FOR RESOLVING DOMAIN NAMES

(71) Applicant: Huawei Technologies Co., Ltd., Shenzhen (CN)

(72) Inventors: Avigail Oron, Munich (DE); Itamar Ofek, Munich (DE); Dan Touitou, Munich (DE)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/716,760

(22) Filed: Dec. 17, 2019

(65) Prior Publication Data

US 2020/0127965 A1    Apr. 23, 2020

Related U.S. Application Data

(63) Continuation of application No. PCT/EP2018/069132, filed on Jul. 13, 2018.

(51) Int. Cl.
*G06F 15/16* (2006.01)
*H04L 29/12* (2006.01)
(Continued)

(52) U.S. Cl.
CPC ...... *H04L 61/1511* (2013.01); *G06F 16/1805* (2019.01); *G06F 16/1824* (2019.01);
(Continued)

(58) Field of Classification Search
CPC ............ H04L 61/1511; H04L 63/045; H04L 63/0823; H04L 63/061; H04L 63/0442;
(Continued)

(56) References Cited

U.S. PATENT DOCUMENTS

| 10,701,052 B2* | 6/2020 | Shull ................. H04L 63/08 |
| 2013/0085914 A1* | 4/2013 | McPherson ......... H04L 61/1511 705/34 |

(Continued)

OTHER PUBLICATIONS

RFC1123, Requirements for Internet Hosts—Application and Support, 1989, 197 pages (Year: 1989).*
(Continued)

*Primary Examiner* — Richard G Keehn
(74) *Attorney, Agent, or Firm* — Conley Rose, P.C.

(57) ABSTRACT

A method for resolving domain names, where a name server is configured to receive a query for a domain name system (DNS) record from a stub resolver, where a public key or certificate held by the stub resolver matches a private key of the name server. The name server runs the query for a DNS record by executing code in a trusted execution environment. Instead of recursively resolving the query for a DNS record as is common practice, the name server reads the DNS record corresponding to the query from a ledger. At last the name server prepares an authenticated response to the stub resolver by authenticating the response comprising the read DNS record with its private key, wherein the private/public key pair or alternatively private key and matching certificate are protected and distributed with the at least another name server via the common ledger.

20 Claims, 3 Drawing Sheets

(51) Int. Cl.
*G06F 16/182* (2019.01)
*G06F 16/18* (2019.01)
*H04L 29/06* (2006.01)
*G06F 21/64* (2013.01)
*G06F 21/71* (2013.01)
*H04L 9/32* (2006.01)

(52) U.S. Cl.
CPC .............. *G06F 21/64* (2013.01); *G06F 21/71* (2013.01); *H04L 9/3239* (2013.01); *H04L 63/045* (2013.01); *H04L 63/0442* (2013.01); *H04L 63/061* (2013.01); *H04L 63/0823* (2013.01); *H04L 2209/38* (2013.01)

(58) Field of Classification Search
CPC ............... H04L 9/3239; H04L 2209/38; G06F 16/1824; G06F 16/1805; G06F 21/64; G06F 21/71
See application file for complete search history.

(56) References Cited

U.S. PATENT DOCUMENTS

| | | | |
|---|---|---|---|
| 2013/0198065 A1* | 8/2013 | McPherson | H04L 12/1435 705/40 |
| 2015/0222590 A1* | 8/2015 | Luo | H04L 61/1511 709/245 |
| 2017/0041333 A1* | 2/2017 | Mahjoub | H04L 61/1511 |
| 2017/0272467 A1* | 9/2017 | Osterweil | H04L 63/0435 |
| 2018/0183812 A1* | 6/2018 | Maresca | H04L 63/08 |
| 2018/0343122 A1* | 11/2018 | Spacek | H04L 9/14 |
| 2019/0280948 A1* | 9/2019 | Abley | H04L 12/46 |
| 2020/0213085 A1* | 7/2020 | Fletcher | H04L 9/3255 |

OTHER PUBLICATIONS

Pei, M., et al. ,"Trusted Execution Environment Provisioning (TEEP) Architecture," draft-ietf-teep-architecture-00.txt, XP015127662, Jul. 2, 2018, 24 pages.

Ali, M., et al., "Blockstack: A Global Naming and Storage System Secured by Blockchains," XP055393635, USENIX Technical Conference, Jun. 22-24, 2016, 15 pages.

Wei-Hong, H., et al., "Review of blockchain-based DNS alternatives," XP055534786, Chinese Journal of Network and Information Security, vol. 3 No. 3, Mar. 2017, 7 pages.

Grothoff, C., et al., "Toward secure name resolution on the Internet" XP085485720, Elsevier, Computers and Security, vol. 77, Aug. 2018, pp. 694-708.

* cited by examiner

200

210
Receive a query for a DNS record from a client device comprising an SR, wherein a public key or certificate of the SR matches a private key of the NS

220
Run the query by executing code in a TEE, wherein the TEE provides a secure area of a main processor

230
Read the DNS record corresponding to the query from a common ledger, wherein the common ledger is shared with at least another NS and comprises a plurality of data entries, which point to the queried DNS record and wherein each data entry is encrypted or signed by a trusted mechanism

240
Prepare a response to the SR, wherein the response comprises the read DNS record corresponding to the query from the SR

250
Authenticate the response with the private key, wherein the private/public key pair or private key and matching certificate are protected and distributed with the at least another NS via the common ledger

260
Send the authenticated response to the SR

FIG. 2

DEVICE AND METHOD FOR RESOLVING DOMAIN NAMES

CROSS-REFERENCE TO RELATED APPLICATIONS

This application is a continuation of International Patent Application No. PCT/EP2018/069132 filed on Jul. 13, 2018, which is hereby incorporated by reference in its entirety.

TECHNICAL FIELD

The present disclosure generally relates to domain name resolution, particularly to the resolution of domain names in a way that guarantees the integrity of the results. Especially, the disclosure is about resolving domain names in a trusted execution environment (TEE) and authenticating responses of name servers. To this end, the present disclosure proposes a device, system and method for respectively resolving domain names.

BACKGROUND

The present domain name system (DNS) is a hierarchical system comprised of a set of root servers (with fixed Internet Protocol (IP) addresses), top level domains servers (TLDs) and name servers. Most prominently, it translates more readily memorized domain names to the numerical IP addresses needed for locating and identifying computer services and devices with the underlying network protocols. This process of translation is called resolution of domain names. By providing a worldwide, distributed directory service, the DNS is an essential component of the functionality of the Internet. A typical resolution process starts with a stub resolver (SR), typically residing on a desktop used for browsing the internet, asking a recursive resolver (RR), which is typically a service provided by an internet service provider (ISP) for a specific DNS record. The RR traverses the DNS tree, starting from a root server, follows the references down in the relevant TLDs and name servers until it encounters the authoritative name server for the requested domain, which provides the actual answer to the DNS queries such as—mail server IP address or web site IP address. The RR sends this record back to the SR enabling the browser of the user's desktop to connect with the provided server address and display the sought after content in the browser of the user's desktop. Moreover, the RR also stores all DNS records it encountered in its cache, which can be used for future resolution requests as long as the time to live (TTL) of the records has not passed.

A fundamental problem with the DNS is the integrity of the results.

DNS servers are often a target for attacks, since this enables directing website traffic to malicious servers, which is used for account/credential collection.

Governments may control traffic to websites by instructing all ISPs to redirect specific DNS lookups, as was done in 2014 to Twitter.com traffic in Turkey.

A centralized DNS service might experience service downtime, especially under massive distributed denial-of-service (DDoS) attacks, as was the case in the attack on Dyn.com, which resulted in users unable to access NETFLIX, AIRBNB, and other sites for more than 2 hours.

One scheme has been devised to address above problems.

DNSSEC, which stands for DNS Security Extensions (DNSSEC), is a suite of Internet Engineering Task Force (IETF) specifications for securing certain kinds of information provided by the DNS as used on IP networks and was devised to answer the integrity issue. With DNSSEC, DNS records are signed by keys whose trust can be traced back to the DNS root servers, thus establishing a chain of trust. For DNSSEC-signed zones, supporting RRs can perform this validation as part of resolution process, thus insuring the integrity of the result.

However, there are two problems with this approach. Firstly, only a fraction of DNS zones are DNSSEC signed, so this technique does not provide enough coverage. Secondly, the SR (the client) is provided with only the answer—the required DNS record and a flag stating, whether the result has been DNSSEC-verified. But it does not receive any evidence to the fact that the validation has indeed happened, or that this answer is authentic, meaning that it was provided by the RR and not by some man in the middle. Therefore, DNSSEC can detect fabricated records, but cannot guarantee a successful resolution.

The authenticity problem has two existing solutions—DNSCrypt and DNS over Transport Layer Security (TLS).

In DNSCrypt the RR signs the answers with a private key so that any calling SR can verify the authenticity of the result. In DNSCrypt an SR has to have the public DNSCrypt key of that specific RR it wants to query. If multiple resolvers should be used—multiple keys should be held, which not only lowers security (that is, by trusting too many may cause to trust no one), but also complicates the administration of key distribution (for new devices or upon periodic key rollover). Sticking to a single key, or even just a few, usually conflicts with the need to use the nearest DNS service available to reduce latency, or just to transparently use whatever DNS service the current network being connected to is pointing my device at (ISPs, WI-FI networks, virtual private networks (VPNs), etc.). Therefore, DNSCrypt ensures authenticity but not integrity, since the RR can be hacked, or its DNSCrypt key can be stolen.

DNS over TLS has similar advantages and disadvantages. Here a certificate is distributed to clients, matching a single RR. If multiple RRs are to be trusted—multiple certificates should be distributed to and held by the clients, and oftentimes a complete collection of certificates authorities is trusted to minimize the management overhead while increasing the security risk.

DNS on blockchain, such as Ethereum NameService, Namecoin or Blockstack answers the centralization problem of the DNS service in order to avoid censorship exhibiting the following advantages.

Decentralized DNS can prevent censorship.

Poisoning a single DNS server can be detected via the blockchain.

Distributed ledger makes the DNS service highly available even under massive DDoS attacks.

Poisoning the DNS records is harder, because the data is replicated across the blockchain. Moreover, since the data is distributed downtime risk due to e.g DDoS attacks is mitigated. In current solutions, the miner provides proof to its peers either via proof-of-work, which adds latency to DNS modification transactions, or via the mere fact that all miners are owned by a single organization. In this case the miner population is relatively small and the advantages of decentralization are lost. In addition, miners offer reliable answers for domains they are authoritative for, however any other domains may be resolved by them but without guarantee.

However, all above techniques suffer from the following drawbacks.

Not all RRs can be trusted.

Protection and distribution of security keys to ensure authenticity of RRs is cumbersome.

SUMMARY

In view of the above-mentioned problems and disadvantages, the present disclosure aims to improve the existing methods and the mentioned techniques. The present disclosure has the objective to provide a device and method that is able to improve the integrity of DNS results. In particular, the device should be trustworthy, particularly should be able to prove that it is running trusted code. Furthermore, devices according to the present disclosure should use the same key pair that is protected and distributed in a network in a secured manner.

The objective of the present disclosure is achieved by the solution provided in the enclosed independent claims. Advantageous implementations of the present disclosure are further defined in the dependent claims.

In particular, the present disclosure proposes the improvement of the integrity of DNS results based on a name server, which may operate as an RR to run a DNS query, but may also act as an authoritative name server in a TEE employing an authentication scheme in responding to a query of an SR.

A first aspect of the present disclosure provides a device for resolving domain names comprising a name server (NS), being configured to receive a query for a DNS record from a client device comprising an SR, wherein a public key or certificate of the SR matches a private key of the NS, run the query by executing code in a TEE, wherein the TEE provides a secure area of a main processor, read the DNS record corresponding to the query from a common ledger, wherein the common ledger is shared with at least another NS and comprises a plurality of data entries, which point to the requested DNS record, prepare a response to the SR, wherein the response comprises the read DNS record corresponding to the query from the SR, authenticate the response with the private key, wherein the private/public key pair or private key and matching certificate are protected and distributed with the at least another NS via the common ledger, and send the authenticated response to the SR.

By employing a NS running a query for a DNS record in a TEE the integrity of the result of the query can be ensured. In particular, the requested DNS record is read from data entries in a ledger, which may be shared by a plurality of NSs and hence serves as a common, safe data repository. The data entries may be encrypted or signed by a trusted mechanism, which may be the private/public key pair or private key and matching certificate, which is also used for creating an authenticated communication channel between the SR and the NS as is described in the following paragraph.

After retrieving the data from the ledger, the response to the querying SR is authenticated with a public/private key scheme or private key and matching certificate scheme. By these measures the integrity of the retrieved DNS records is ensured due to the TEE, while the authenticity of the retrieved records and of the query/response entities (e.g. NS, SR) is ensured by authentication with a key or certificate mechanism.

In an implementation form of the first aspect, the TEE is based on instruction codes provided by Software Guard Extensions (SGX) technology.

A TEE provides a secure area of a main processor. It guarantees that code and data loaded inside are protected with respect to confidentiality and integrity. A TEE is an isolated execution environment which provides security features such as isolated execution, integrity of applications executing with the TEE, along with confidentiality of their assets. For example, Intel's SGX provides a particular set of CPU instruction codes that allow user-level code to allocate private regions of memory, called enclaves that are protected from processes running at higher privilege levels.

In a further implementation form of the first aspect, the common ledger is stored in a globally accessible storage or is distributed across the NSs via any file distribution mechanism, or any other solution that allows all NSs to share a same logical instance of the ledger.

In a further implementation form of the first aspect, each of the data entries comprises a plurality of DNS records, wherein each data entry is encrypted or signed using a secret or private key that is shared by all NSs and wherein the plurality of DNS records is a DNS zone.

The secret/private key mechanism, wherein a public key or certificate of the SR matches a private key of the NS, enables a client like a SR to challenge the NS to attest itself and thus prove to be trustworthy, and establish an authenticated communication channel with that entity. As part of the attestation, the NS confirms its identity, verifies that it has not been tampered with, and proves that it is running on a genuine platform, e.g. enabled by SGX.

Since all NSs are trusted, they may all share the same single key pair (e.g. DNSCrypt) or certificate (e.g. TLS). This means that the client can hold a single key or certificate while having a potentially large collection of resolvers, geographically spread, that can serve its requests in an authenticated manner.

In a further implementation form of the first aspect, the NS is further configured to read the DNS record from the common ledger, if the NS is authoritative for the DNS zone, and to operate as a RR and to recursively resolve the query for a DNS record via a standard DNS resolution process, if the NS is not authoritative for the DNS zone.

The NSs can be used as authoritative name server(s) for domain owners' zone records (for a fee) or as resolvers (free of charge) for domains either hosted on a blockchain or having 'classic' name servers. This hybrid approach allows a gradual migration of DNS zones into the common ledger, which maybe a blockchain or any other distributed persistency mechanism.

In a further implementation form of the first aspect, the NS is further configured to share resolution data of the standard DNS resolution process in a cache of the NS, which cache is shared with the at least another NS via the common ledger.

By keeping records, which are retrieved using 'classic' resolution, in cache, which is also shared with peer NSs via the ledger (with TTL), the time for resolving a requested domain name within the TTL boundary is reduced.

In a further implementation form of the first aspect, the NS is further configured to share the resolution data in the cache via the ledger of a blockchain or any other distributed persistency mechanism within an allowed time span (TTL).

In case of using a blockchain, the NS may be a DNS miner in a blockchain managing a common ledger. All DNS miners are running in TEE (e.g. SGX), so all miners are inherently trusted. The blockchain is open for anyone to join, which enables a wider setup of the blockchain resulting in decentralization advantages. Further, no proof of work is required, since all peer DNS miners can verify that a miner is running the trusted code. This lowers the cost for setting up and operating a miner, which again, makes the number of miners potentially bigger.

In a further implementation form of the first aspect, the allowed time span is determined via a time-to-live, TTL, mechanism.

In a further implementation form of the first aspect, the NS is further configured to add retrieved records to the common ledger with their TTL, if the zone is DNSSEC-signed, whose name servers are outside of the ledger and if DNSSEC-validation is successful.

While DNSSEC-signed DNS records ensure integrity of the data, a SR receiving the DNSSEC-record does not receive any evidence to the fact that the validation has indeed happened, or that this answer is authentic, meaning that it was provided by the RR or name server respectively and not by some man-in-the-middle device. This security hole is closed by the NS of the present disclosure, which is trusted due to its running in a TEE. As a result, each successful resolution of DNSSEC-signed zones of domains, whose name servers are outside of the ledger (in classic DNS name servers), leads to the addition of zone data to the ledger with the TTL that is attached to the data.

A second aspect of the present disclosure provides a system for recursively resolving domain names comprising a plurality of devices according to any of the implementation forms of the first aspect and the client device comprising the SR, whereby the plurality of devices are of the same common ledger and share the same key pair or private key/matching certificate pair to process the DNS record corresponding to the query from the SR.

Accordingly, the system of the second aspect achieves all advantages and effects of the device of the first aspect and its implementation forms. This system of the second aspect can be implemented, for instance, in a blockchain managing a common ledger.

The solution of the second aspect is comprised of a set of name servers, which may be DNS miners in a new blockchain managing a common ledger. All NSs or DNS miners respectively are running in the TEE (e.g. leveraging SGX). As a result, all miners are trusted, because they all run trusted code. Since all miners are trusted, they all share the same single (e.g. DNSCrypt) key pair or private key/matching certificate pair, which is used to open an authenticated channel with a SR. The key pair or private key/matching certificate pair may also be used by the NSs to validate the encrypted/signed records in the ledger.

In a further implementation form of the second aspect, the SR is further configured to choose the NS, which is providing the nearest DNS service in order to reduce latency.

In a further implementation form of the second aspect, the plurality of NSs have the same IP address and any calling SR will be directed to the least-distant NS.

If all trusted NSs have the same IP address using e.g. an anycast addressing scheme, any calling SR will be directed to the least-distant NS. As a result, latency time is reduced.

In a further implementation form of the second aspect, each of the NSs is configured to run the same trusted code and to perform a same resolution process.

Since all trusted NSs are running the same trusted code, they all perform the same resolution process. Different SRs calling different NSs to resolve a same zone record will get the same response.

A third aspect of the present disclosure provides a method for resolving domain names applied to a NS, comprising the steps of receiving a query for a DNS record from a client device comprising a SR, wherein a public key or certificate of the SR matches a private key of the NS, running the query by executing code of a TEE, wherein the TEE provides a secure area of a main processor, reading the DNS record corresponding to the query from a common ledger, wherein the common ledger is shared with at least another NS and comprises a plurality of data entries, which point to the requested DNS record and wherein each data entry is encrypted or signed by a trusted mechanism, preparing a response to the SR, wherein the response comprises the read DNS record corresponding to the query from the SR, authenticating the response with the private key, wherein the private/public key pair or private key and matching certificate are protected and distributed with at least another NS via the common ledger, and sending the authenticated response to the SR.

The method of the third aspect can have implementation forms that correspond to the implementation forms described above for the device of the first aspect. Accordingly, the method of the third aspect achieves all advantages and effects described above for the device of the first aspect and its implementation forms, respectively.

In an implementation form of the third aspect, the TEE is based on instruction codes provided by SGX technology.

In a further implementation form of the third aspect, the common ledger is stored in a globally accessible storage or is distributed across the NSs via any file distribution mechanism, or any other solution that allows all NSs to share a same logical instance of the ledger.

In a further implementation form of the third aspect, each of the data entries comprises a plurality of DNS records, wherein each data entry is encrypted or signed using a secret or private key that is shared by all NSs and wherein the plurality of DNS records is a DNS zone.

In a further implementation form of the third aspect, the NS further reads the DNS record from the common ledger, if the NS is authoritative for the DNS zone, and operates as a RR and recursively resolves the query for a DNS record via a standard DNS resolution process, if the NS is not authoritative for the DNS zone.

In a further implementation form of the third aspect, the NS further shares resolution data of the standard DNS resolution process in a cache of the NS, which cache is shared with the at least another NS via the common ledger.

In a further implementation form of the third aspect, the NS further shares the resolution data in the cache via the ledger of a blockchain or any other distributed persistency mechanism within an allowed time span (TTL).

In a further implementation form of the third aspect, the allowed time span is determined via a time-to-live, TTL, mechanism.

In a further implementation form of the third aspect, the NS further adds retrieved records to the common ledger with their TTL, if the zone is DNSSEC-signed, whose name servers are outside of the ledger and if DNSSEC-validation is successful.

A forth aspect of the present disclosure provides a computer program product comprising program code for controlling a device according to any implementation form of the first aspect or for performing, when implemented on a processor, a method according to the third aspect.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities.

Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF THE DRAWINGS

The above described aspects and implementation forms of the present disclosure will be explained in the following description of specific embodiments in relation to the enclosed drawings.

FIG. 2 shows a method according to an embodiment of the present disclosure.

DETAILED DESCRIPTION OF THE EMBODIMENTS

Figure 1:
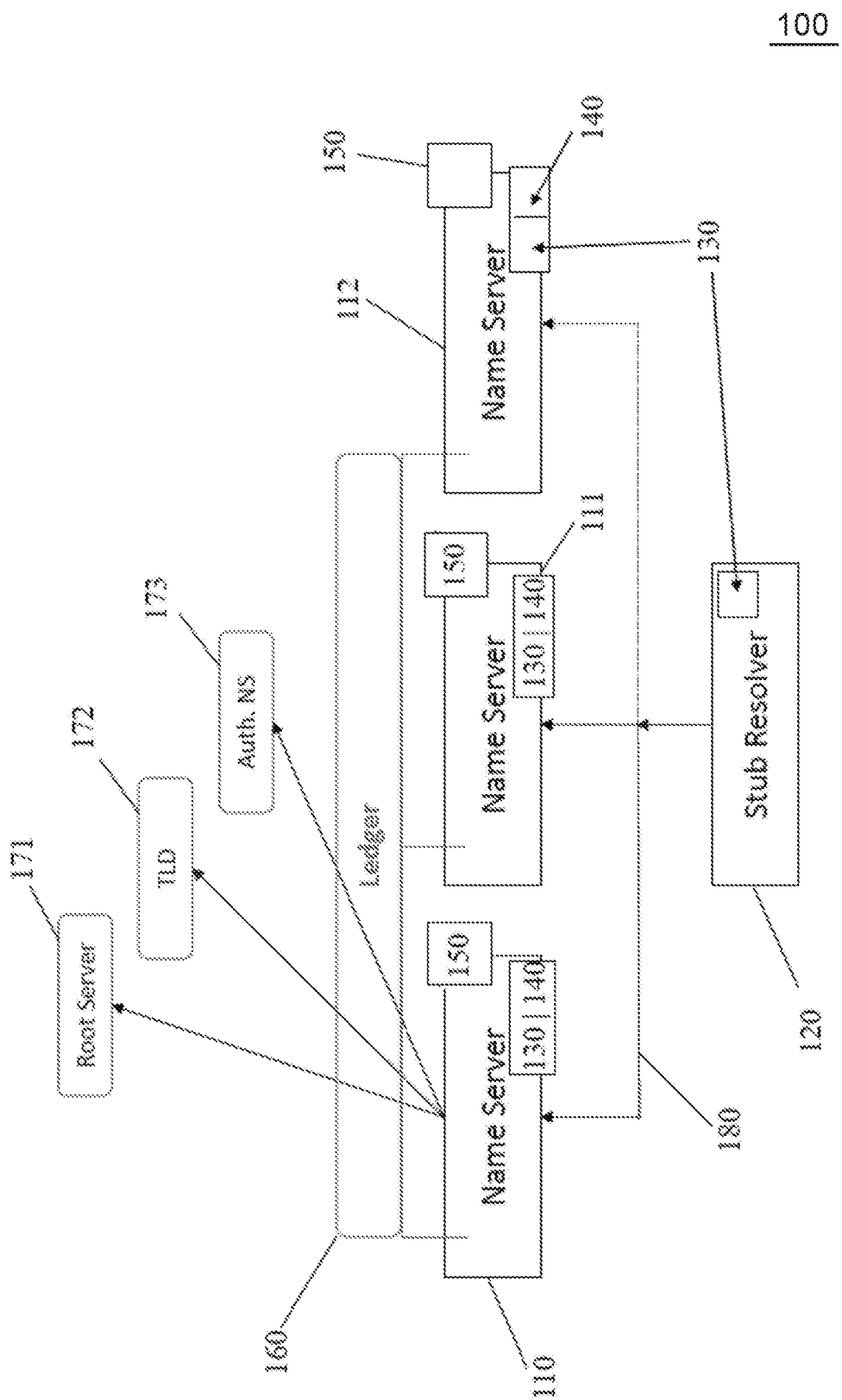
FIG. 1 shows a system according to an embodiment of the present disclosure.

FIG. 1 shows a system 100 according to an embodiment of the present disclosure. The system 100 may comprise a plurality of devices according to an embodiment of the disclosure, wherein each device comprises a NS 110-112 (FIG. 1 shows for reasons of simplicity only the NSs 110-112 of the devices, and in the following reference is made to NSs 110-112). The system 100 is especially suited for improving the integrity of DNS results. The features of any of the NSs 110-112 are described in the following by referring to one NS 110.

NS 110 is configured to receive a query for a DNS record from a client device, which may comprise or be an SR 120 (in the following, reference is made only to SR 120), wherein a public key 130 or certificate of the SR 120 matches a private key 140 of the NS 110. "Matching" public key 130 and private key 140 in this document means that the public key 130 and private key 140 are created together as a pair. They are, in particular, two long numbers that maintain a specific mathematical relationship. That is, a public key 130 that matches a private key 140 is a number that relates to the private key 140 in a specific mathematical way. The mathematical relationship results in the fact that any information encrypted using the private key 140 can be decrypted with the public key 130, and any information encrypted with the public key 130 can be decrypted using the private key 140. In fact, the public key 130 is the only key that can decrypt information that was encrypted using the private key 140 (and vice versa).

Further, NS 110 is configured to run the query for a DNS record by executing code in a TEE 150, wherein the TEE 150 provides a secure area of a main processor by e.g. using a hardware root of trust. Herewith, malicious simulation of hardware with a user-controlled software e.g. man-in-the-middle attacks between the NS 110 and the SR 120 is at least impeded.

NS 110 is further configured to read the DNS record corresponding to the query from a ledger 160, which is a replicated, shared, and synchronized digital data repository, possibly geographically spread across multiple sites, countries, or institutions and which may be shared with at least another NS 111 or 112. The common ledger 160 may comprise a plurality of data entries, which point to the requested DNS record, wherein each data entry may be encrypted or signed by a trusted mechanism. The encryption of the data entry as well as the authentication of the communication with the SR 120 may be performed by the private key 140 of the NS 110. Alternatively, any other secret key or certificate system may be used for encrypting/signing and decrypting/validating DNS records in the ledger 160 may be used.

The NS 110 is further configured to prepare a response to the SR 120, wherein the response comprises the read DNS record corresponding to the query from the SR 120 and to authenticate the response with the private key 140, wherein the private/public key pair 140/130 or alternatively private key 140 and matching certificate are protected and distributed with the at least another NS 111 or 112 via the common ledger 160. At last, the NS 110 is configured to send the authenticated response to the SR 120.

In case of the SR 120 using a public key 130, the NS 110 may hold the public key 130 and the corresponding private key 140. In case of the SR 120 using a certificate instead of a public key 130, as in the DNS-over-TLS mechanism, the public key 130 may be included in the certificate, which may provide additional meta-data like which CA (certificate authority) had issued the certificate, its expiration date, etc.

Alternatively, the communication between the NS 110 and the SR 120 may only be signed. In this case, all requests & responses between the names server and the SR 120 may be sent in plain text. However, to make sure the responses come from an authenticated source—they are signed using the private key 140 that only the NS 110 has, while the SR 120 uses the corresponding public key 130 to verify the signature.

In order to resolve requests from the SR 120 for DNS zones that are not managed in the common ledger 160, the NS may be further configured to resolve said request via a standard DNS process, wherein the NS 110 may be operating as a RR resorting to cascading queries of a root server 171, then TLD server 172 and finally the authoritative name server 173. If the NS 110 of the present disclosure is authoritative for a particular DNS zone, which is a portion of a DNS domain, and the requested DNS zone is managed in the common ledger 160, the NS 110 is configured according to the above described.

This hybrid approach allows a gradual migration of DNS zones into the common ledger 160, which may be constituted by a blockchain. Once the resolution data of the standard DNS resolution process are obtained, they may be kept in a cache of the NS, whereby the cache may be shared with the at least another NS 111, 112 via the common ledger 160. Sharing the cache with other NSs or miners (if a blockchain is used to run a common ledger), reduces the time it takes to resolve domain names within the TTL boundary. A resolution process according to present disclosure will be discussed in the comments to FIG. 3.

Since all NSs 110-112 (or miners in case of a common ledger via a blockchain) are trusted by running trusted code, they may all share the same single (e.g. DNSCrypt) key pair (public/private 130/140) or certificate/key (e.g. TLS) pair (certificate/private key). This means that the client or SR 120 can hold a single (public) key or certificate (comprising the public key), while having a potentially large collection of resolvers (name servers), geographically spread, that can serve its requests in an authenticated and time-efficient manner, since the SR 120 may use any name serve, which is the "closest" in terms of response time. For this purpose, all NSs 110-112 may further be configured to have the same IP address (e.g. anycast addressing), which allows for directing any calling SR 120 to the least-distant NS 180, whereby least-distant is meant as exhibiting the shortest response time.

A key rollover maybe part of the protocol regulating the employment of the NS of this present disclosure. Therefore, no manual key distribution is required and client management as in the DNSCrypt or DNS-on-TLS authentication systems is eliminated.

FIG. 2 shows a method 200 according to an embodiment of the present disclosure, wherein the method 200 comprises the following steps.

Step 210. Receive a query for a DNS record from a client device comprising an SR, wherein a public key or certificate of the SR matches a private key of the NS.

Step 220. Run the query by executing code of a TEE, wherein the TEE provides a secure area of a main processor.

Step 230. Read the DNS record corresponding to the query from a common ledger, wherein the common ledger is shared with at least another NS and comprises a plurality of data entries, which point to the queried DNS record and wherein each data entry is encrypted or signed by a trusted mechanism.

Step 240. Prepare a response to the SR, wherein the response comprises the read DNS record corresponding to the query from the SR.

Step 250. Authenticate the response with the private key, wherein the private/public key pair or private key and matching certificate are protected and distributed with at least another NS via the common ledger.

Step 260. Send the authenticated response to the SR.

The method 200 of FIG. 2 may be carried out by a device according to an embodiment of the disclosure, which comprises a NS 110-112, i.e. a device illustrated by one of the NS 110-112 in FIG. 1. Accordingly, each NS 110-112 of FIG. 1 is configured to carry out the method steps 210-260 of the method 200.

Figure 3:
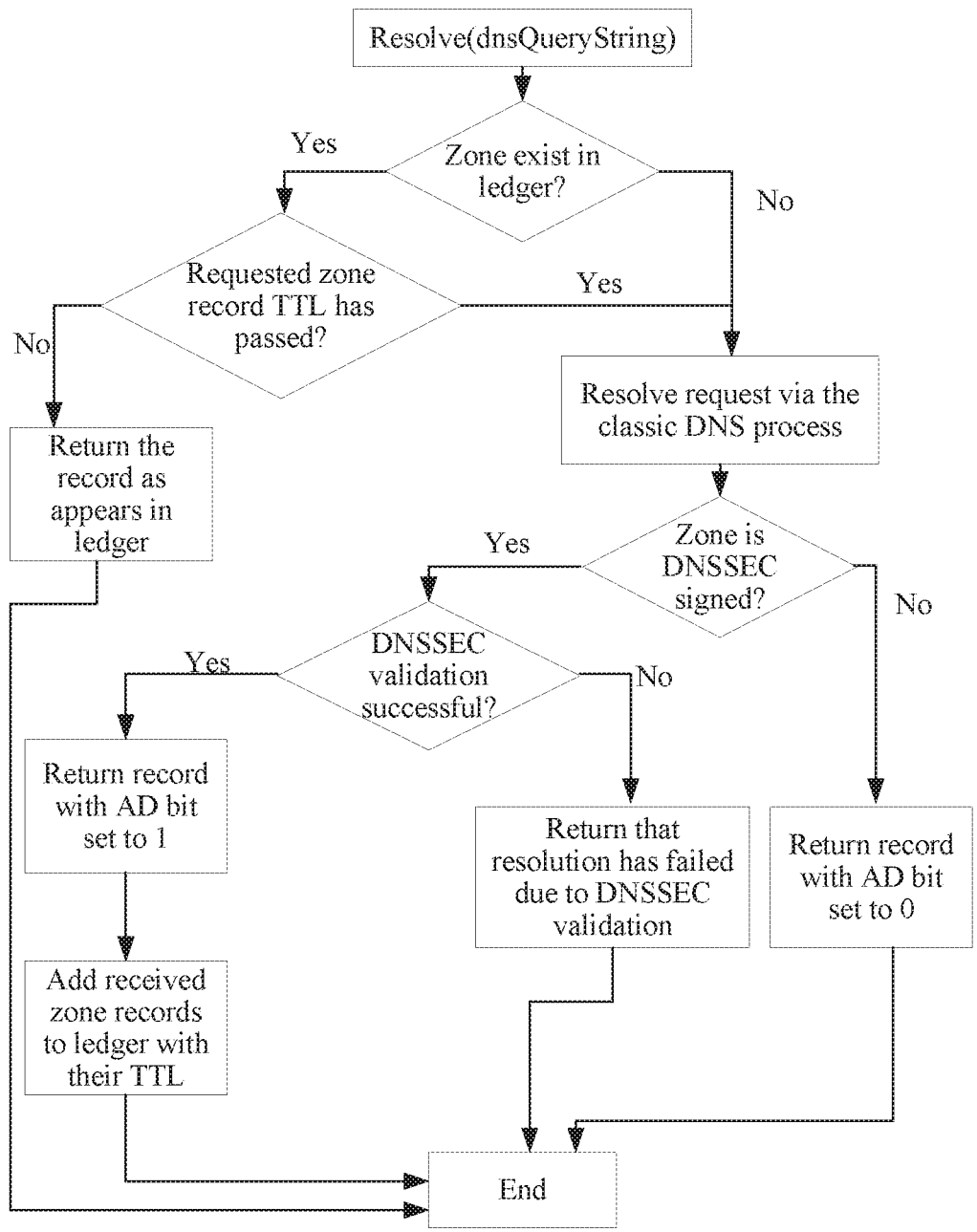
FIG. 3 shows a flow chart according to an embodiment of the present disclosure.

FIG. 3 shows a flow chart 300 according to an implementation of the present disclosure. It depicts an implementation of the resolution process initiated by an SR 120 by employing an NS 110-112 as described in FIG. 1. The flow chart 300 explains the above mentioned hybrid approach of gradually migrating into the common ledger those DNS zones, whose name servers (classic DNS name servers) are outside of the common ledger.

Once a resolve request is issued by an SR 120 and sent to an NS 110-112 of the presently claimed disclosure, it is determined if the requested DNS record is part of a DNS zone which is managed by the (common) ledger.

If this is the case, it is determined if the TTL of the requested zone record has passed. If the requested record is still alive, the record will be returned to the SR 120 as it appears in the ledger. If TTL has passed, the command flow follows the next case.

If the requested zone record is not in the ledger 160, the requested DNS record is resolver according to the classic DNS resolution process known in the art. If the requested record is within a zone, which comprises DNSSEC-signed records, it is checked if the validation of the DNSSEC-signed record was successful. In case of success, the received zone record is added to the ledger with its respective TTL. If either the requested record is not in the DNSSEC-secured zone or DNSSEC validation was not successful. No additional record is added to the ledger.

The zone files are generally written into the ledger as part of either of the following activities:

Creation/modifications/deletion of DNS zones for domains that are managed in this ledger 160 (authoritative).

Successful resolution of DNSSEC-signed zones of domains, whose name servers are outside of the ledger 160 (in classic DNS name servers). Each such successful resolution adds the zone data to the ledger 160, with the TTL that was attached to it.

For this purpose each NS 110-112 of the present disclosure may externalize the following application program interface (API):

createZone(zoneData):returnCode;
updateZone(zoneData):returnCode; and
resolve(dnsQueryString):dnsStandardResultString.

The functions "createZone" and "updateZone" write the zone data into the ledger. Calling these methods requires authentication to verify that only the user, who created the zone, can modify it. The function "resolve" is an implementation of the standard resolution operation definition of a DNS resolver, if the requested zone record does not exist in the ledger. This function may also only be called in an authenticated manner. Authentication can be done via any secured means, such as DNSCrypt or DNS over TLS.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A name server (NS) device for resolving domain names comprising:
 a memory configured to store instructions; and
 a processor coupled to the memory, wherein the instructions cause the processor to be configured to:
  receive a query for a domain name system (DNS) record from a client device comprising a stub resolver (SR), wherein a public key or a certificate of the SR matches a private key of the NS device;
  run the query by executing a code in a trusted execution environment (TEE), wherein the TEE provides a secure area of a main processor;
  read the DNS record from a common ledger, wherein the common ledger is shared with a second NS device and comprises a plurality of data entries pointing to the DNS record;
  prepare a response to the SR, wherein the response comprises the DNS record;
  authenticate the response with the private key, wherein the private key and the public key or the private key and a matching certificate are protected and distributed with the second NS device via the common ledger; and
  send the response to the SR.

2. The NS device of claim 1, wherein the TEE is based on instruction codes of Software Guard Extensions (SGX) technology.

3. The NS device of claim 1, wherein the common ledger is stored in a globally accessible storage.

4. The NS device of claim 1, wherein each of the data entries comprises a plurality of DNS records, wherein each of the data entries is encrypted or signed using a secret key that is shared by all NS devices, and wherein the DNS records are a DNS zone.

5. The NS device of claim 4, wherein the instructions further cause the processor to be configured to:
   read the DNS record from the common ledger when the NS device is authoritative for the DNS zone; and
   operate as a recursive resolver and to recursively resolve the query via a standard DNS resolution process when the NS device not authoritative for the DNS zone.

6. The NS device of claim 5, wherein the instructions further cause the processor to be configured to share resolution data of the standard DNS resolution process in a cache of the NS device such that cache is shared with the second NS device via the common ledger.

7. The NS device of claim 6, wherein the NS instructions further cause the processor to be configured to share the resolution data in the cache via the common ledger of a blockchain or any other distributed persistency mechanism within an allowed time span.

8. The NS device of claim 7, wherein the instructions further cause the processor to be configured to determine the allowed time span via a time-to-live (TIL) mechanism.

9. The NS device of claim 8, wherein the instructions further cause the processor to be configured to add retrieved records to the common ledger with corresponding TTLs when the DNS zone is DNS Security Extensions (DNSSEC)-signed, whose NS devices are outside of the common ledger and when DNSSEC-validation is successful.

10. The NS device of claim 1, wherein the common ledger is distributed across all NS devices via a file distribution mechanism.

11. The NS device of claim 1, wherein the common ledger is distributed across all NS devices via a solution allowing all the NS devices to share a same logical instance of the common ledger.

12. A system for recursively resolving domain names, comprising:
   a client device comprising a stub resolver (SR); and
   a plurality of name server (NS) device, wherein an NS device comprising:
      a memory configured to store instructions; and
      a processor coupled to the memory, wherein the instructions cause the processor to be configured to:
         receive a query for a domain name system (DNS) record from a client device, wherein a public key or a certificate of the SR matches a private key of the NS device;
         run the query by executing a code in a trusted execution environment (TEE), wherein the TEE provides a secure area of a main processor;
         read the DNS record from a common ledger, wherein the common ledger is shared with a second NS device and comprises a plurality of data entries pointing to the DNS record;
         prepare a response to the SR, wherein the response comprises the DNS record;
         authenticate the response with the private key, wherein the private key and the public key or the private key and a matching certificate are protected and distributed with the second NS device via the common ledger; and
         send the response to the SR,
      wherein the NS devices are of the common ledger and share the private key and the public key or the private key and the matching certificate.

13. The system of claim 12, wherein the SR is further configured to choose the NS device as a first NS device, and wherein the first NS device configured to provide a nearest DNS service in order to reduce latency.

14. The system of claim 12, wherein the NS devices comprise a same Internet Protocol (IP) address, and wherein the SR is directed to a least-distant NS device.

15. The system of claim 12, wherein each of the NS devices is configured to;
   run a same trusted code; and
   perform a same resolution process.

16. A method for resolving domain names implemented by a name server (NS) device, comprising:
   receiving a query for a domain name system (DNS) record from a client device comprising a stub resolver (SR), wherein a public key or a certificate of the SR matches a private key of the NS device;
   running the query by executing a code of a trusted execution environment (TEE), wherein the TEE provides a secure area of a main processor;
   reading the DNS record from a common ledger, wherein the common ledger is shared with a second NS device and comprises a plurality of data entries pointing to the DNS record;
   preparing a response to the SR, wherein the response comprises the DNS record;
   authenticating the response with the private key, wherein the private key and the public key or the private key and a matching certificate are protected and distributed with the second NS device via the common ledger; and
   sending the response to the SR.

17. A computer program product comprising computer-executable instructions stored on a non-transitory computer-readable medium that, when executed by a processor, cause a name server (NS) device to:
   receive a query for a domain name system (DNS) record from a client device comprising a stub resolver (SR), wherein a public key or a certificate of the SR matches a private key of the NS device;
   run the query by executing a code in a trusted execution environment (TEE), wherein the TEE provides a secure area of a main processor;
   read the DNS record from a common ledger, wherein the common ledger is shared with a second NS device and comprises a plurality of data entries pointing to the DNS record;
   prepare a response to the SR, wherein the response comprises the DNS record;
   authenticate the response with the private key, wherein the private key and the public key or the private key and a matching certificate are protected and distributed with the second NS device via the common ledger; and
   send the response to the SR.

18. The computer program product of claim 17, wherein the common ledger is stored in a globally accessible storage.

19. The computer program product of claim 17, wherein the common ledger is distributed across all NS devices via a file distribution mechanism.

20. The computer program product of claim 17, wherein the common ledger is distributed across all NS devices via a solution allowing all the NS devices to share a same logical instance of the common ledger.

* * * * *